United States Patent
Heggebø

(10) Patent No.: US 12,358,722 B2
(45) Date of Patent: Jul. 15, 2025

(54) SYSTEM AND METHOD OF DETERMINING STATUS OF A CHARGING STATION

(71) Applicant: Autostore Technology AS, Nedre Vats (NO)

(72) Inventor: Jørgen Djuve Heggebø, Olen (NO)

(73) Assignee: AutoStore Technology AS, Nedre Vats (NO)

( * ) Notice: Subject to any disclaimer, the term of this patent is extended or adjusted under 35 U.S.C. 154(b) by 350 days.

(21) Appl. No.: 17/928,477

(22) PCT Filed: Jun. 2, 2021

(86) PCT No.: PCT/EP2021/064754
§ 371 (c)(1),
(2) Date: Nov. 29, 2022

(87) PCT Pub. No.: WO2021/249840
PCT Pub. Date: Dec. 16, 2021

(65) Prior Publication Data
US 2023/0202754 A1 Jun. 29, 2023

(30) Foreign Application Priority Data
Jun. 8, 2020 (NO) .................................. 20200674

(51) Int. Cl.
*B65G 1/04* (2006.01)
*B60L 3/00* (2019.01)
(52) U.S. Cl.
CPC .......... *B65G 1/0492* (2013.01); *B60L 3/0046* (2013.01)

(58) Field of Classification Search
CPC .............. B65G 1/0492; B65G 2209/06; B65G 1/0464; B65G 1/065; B60L 3/0046;
(Continued)

(56) References Cited

U.S. PATENT DOCUMENTS 8,111,038 B2 * 2/2012 Wang ................. H02J 7/007182
320/132
10,181,740 B2 * 1/2019 Tanaka ..................... B60L 53/65
(Continued)

FOREIGN PATENT DOCUMENTS

NO 317366 B1 10/2004
NO 20191118 A1 3/2021
(Continued)

OTHER PUBLICATIONS

J. Martinez, Extended European Search Report for European Patent Application No. 24189008.6, mailed Dec. 3, 2024, 20 pages, European Patent Office, Munich, Germany.
(Continued)

*Primary Examiner* — Richard M Camby
(74) *Attorney, Agent, or Firm* — Baker Botts L.L.P.

(57) ABSTRACT

An automated storage and retrieval system includes a rail system, at least one vehicle operating on the rail system, at least one charging station on or at the perimeter of the rail system, and a control system. The rail system includes a first set of parallel rails extending in a first direction and a second set of parallel rails extending in second direction. The second direction is perpendicular to the first direction. The
(Continued)

at least one vehicle includes at least one power storage source, and a local controller adapted to control movements of the at least one vehicle. The at least one charging station is adapted to be electrically connected with the at least one power storage source of the at least one vehicle. The control system is adapted to communicate with the local controller in the at least one vehicle and the at least one charging station. The control system is further adapted to, upon detecting a failure with the charging station, instruct the at least one vehicle to move to the at least one charging station such that the at least one power storage source of the vehicle electrically connects to the at least one charging station. The at least one charging station is further adapted to, transmit a charger diagnostic to the control system using power from the at least one power storage source of the at least one vehicle.

19 Claims, 5 Drawing Sheets

(58) Field of Classification Search
CPC .... B60L 2260/32; B60L 53/305; B60L 53/16; Y02T 10/7072; Y02T 10/70; Y02T 90/12; Y02T 90/14; Y02T 90/16; B60M 7/003
See application file for complete search history.

(56) References Cited

U.S. PATENT DOCUMENTS

| | | |
|---|---|---|
| 2016/0325932 A1 | 11/2016 | Hognaland |
| 2018/0001778 A1 | 1/2018 | Sullivan et al. |
| 2019/0193938 A1 | 6/2019 | Buzan et al. |
| 2020/0271725 A1* | 8/2020 | Herring ................ B60L 58/12 |

FOREIGN PATENT DOCUMENTS

| | | |
|---|---|---|
| WO | 2014/075937 A1 | 5/2014 |
| WO | 2014/090684 A1 | 6/2014 |
| WO | 2015/104263 A2 | 7/2015 |
| WO | 2015/193278 A1 | 12/2015 |
| WO | 2018/146304 A1 | 8/2018 |
| WO | 2019/206490 A1 | 10/2019 |

OTHER PUBLICATIONS

International Search Report issued in PCT/EP2021/064754 on Sep. 24, 2021 (4 pages).
Written Opinion of the International Searching Authority issued in PCT/EP2021/064754 on Sep. 24, 2021 (12 pages).
Norwegian Search Report issued in NO 20200674 mailed on Dec. 11, 2020 (2 pages).

* cited by examiner

SYSTEM AND METHOD OF DETERMINING STATUS OF A CHARGING STATION

FIELD OF THE INVENTION

The present invention relates to an automated storage and retrieval system for storage and retrieval of containers, in particular to a system and method of determining status of a charging station.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X. Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles.

Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

In WO2015104263A2, the contents of which are incorporated herein by reference, a storage system is described having a number of charging stations at the perimeter of the storage grid. Each charging station has the capability of charging a power storage source on each container handling vehicle.

WO2019206490, the contents of which are incorporated herein by reference, describes a storage system having charging stations for charging and/or exchanging replaceable power storage sources of container handling vehicles. Instead of waiting at a charging station, the container handling vehicle may leave a depleted, or near depleted power storage source at first charging station and pick up a charged power storage source at another charging station, typically next to the first charging station. The container handling vehicle may be provided with an auxiliary power source, e.g. battery, for moving between charging stations. The container handling vehicle may also be provided with a plurality of replaceable power storage sources. FIG. 4 illustrates one exemplary container handling vehicle 3 having a replaceable power storage source electrically connected to a charging station 40.

NO20191118, the contents of which are incorporated herein by reference, describes a storage system provided with a number of charging racks for receiving and charging a plurality of replaceable power storage sources for the container handling vehicles and an automated loader vehicle for inserting and retrieving replaceable power storage sources from the container handling vehicle and charging positions in the charging rack at different elevations. The automated loader vehicle allows for replacement of a power storage source on a container handling vehicle anywhere on the rail system. FIG. 5 illustrates one exemplary loader vehicle 50 holding a replaceable power storage source 51.

The chargers are in communication with the central control system for control of the chargers and diagnostics. The chargers may communicate directly with the central control system, wired or wireless, or through container handling vehicles or other vehicles. A problem with the prior art is that when a charger fails, for example due to a failed power supply to the charger, the charger may not be able to communicate the charger diagnostic to the central control system. The central control system may classify the error as a communication failure, but that is a generic error and provides insufficient guidance to a user of the storage system on how to solve the underlying reason for the charger failing.

In view of the above, it is desirable to provide an automated storage and retrieval system, and a method for operating such a system, that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

In one aspect, the invention is related to an automated storage and retrieval system comprising:
  a rail system with a first set of parallel rails extending in a first direction and a second set of parallel rails extending in second direction, wherein the second direction is perpendicular to the first direction,
  at least one vehicle operating on the rail system, the vehicle comprising at least one power storage source, and a local controller adapted to control movements of the at least one vehicle,
  at least one charging station on or at the perimeter of the rail system adapted to be electrically connected with the at least one power storage source of the at least one vehicle, and
  a control system adapted to communicate with the local controller in the at least one vehicle and the at least one charging station, wherein
  the control system is further adapted to, upon detecting a failure with the charging station, instruct the at least one vehicle to move to the at least one charging station such that the at least one power storage source of the vehicle electrically connects to the at least one charging station, and the at least one charging station is further adapted to, transmit a charger diagnostic to the central operational controller using power from the at least one power storage source of the vehicle.

The charging station may comprise a charger communication device adapted to communicate with the control system, and the charger communication device is adapted to receive power from the at least one power storage source to transmit the charger diagnostics to the control system.

Detecting the failure with the charging station may comprise detecting a communication failure with the charger communication device of the charging station.

Alternatively, the at least one charging station may comprise a charger communication device adapted to communicate indirectly with the control system via a vehicle communication device in a vehicle electrically connected to the charging station, and the charger communication device is further adapted to receive power from the at least one power storage source to transmit the charger diagnostics to the control system via the vehicle communication device.

Detecting the failure with the charging station may comprise detecting a communication failure between the charger communication device and the vehicle communication device.

The control system may be further adapted to, prior to instructing the at least one vehicle to move to the at least one charging station, determine that a power storage source is present at the at least one charging station, and waiting a predetermined time for the at least one charging station to transmit the charger diagnostics using power from the present power storage source.

The control system may be further adapted to instruct a second vehicle to remove the present power storage source prior to instructing the at least one vehicle to move to the at least one charging station.

The at least one vehicle may be a container handling vehicle operating on the rail system to receive storage containers from, and deliver storage containers into, storage columns arranged in rows between upright members and horizontal members of the framework structure, and also to transport the storage containers above or below the storage columns.

The at least one power storage source may be a replaceable power storage source.

The at least one vehicle may be a loader vehicle for inserting and retrieving replaceable power storage sources from a second vehicle and inserting and retrieving replaceable power storage sources from the at least one charging station.

The charger diagnostic may comprise at least one of a power supply circuit breaker state, an internal AC circuit breaker state in rectifier, and an error log.

In a second aspect the invention is directed to a method of determining status of at least one charging station in an automated storage and retrieval system comprising:
  a rail system with a first set of parallel rails extending in a first direction and a second set of parallel rails extending in second direction, wherein the second direction is perpendicular to the first direction,
  at least one vehicle operating on the rail system, the vehicle comprising at least one power storage source, and a local controller adapted to control movements of the at least one vehicle,
  the at least one charging station being on or at the perimeter of the rail system adapted to be electrically connected with the at least one power storage source of the at least one vehicle, wherein the method comprises:
  detecting a failure with the at least one charging station,
  instructing the at least one vehicle to move to the at least one charging station such that the at least one power storage source of the vehicle is electrically connected to the at least one charging station, receiving a charger diagnostic transmitted from the at least one charging station using power from the at least one power storage source of the vehicle, and determining a status of the charging station based on the charger diagnostic received from the at least one charging station.

The method may further comprise, prior to instructing the at least one vehicle to move to the at least one charging station, determine that a power storage source is present at the at least one charging station, and waiting a predetermined time for the at least one charging station to transmit the charger diagnostic using power from the present power storage source.

The method may further comprise instructing a second vehicle to remove the present power storage source prior to instructing the at least one vehicle to move to the at least one charging station.

The charger diagnostic may comprise at least one of a power supply circuit breaker state, an internal AC circuit breaker state in rectifier, and an error log.

In a third aspect, the invention provides a computer program product for a control system in the system of the first aspect, wherein the computer program product comprises instructions which when executed on the control system performs the method of the third aspect.

In a fourth aspect, the invention provides a charging station on or at the perimeter of a rail system in an automated storage and retrieval system comprising, a rail system with a first set of parallel rails extending in a first direction and a second set of parallel rails extending in second direction, wherein the second direction is perpendicular to the first direction, at least one vehicle operating on the rail system, the vehicle comprising at least one power storage source, and a local controller adapted to control movements of the at least one vehicle, a control system adapted to communicate with the local controller in the at least one vehicle and the charging station, and is adapted to, upon detecting a failure with the charging station, instruct the at least one vehicle to move to the at least one charging station, wherein the charging station comprises:

connectors adapted to electrically connect to the at least one power storage source of the vehicle;

at least one charger communication device adapted to communicate with the control system;

at least one processor adapted to perform a charger diagnostic of the charging station; and electronic circuitry adapted to receive power from the at least one power storage source of the vehicle via the connectors, and supply power to the charger communication device and the at least one processor such that the processor performs charger diagnostic of the charging station and transmits the charger diagnostic to the control system using the at least one charger communication device.

The charging station may further comprise a memory connected to the electronic circuitry and the at least one processor, the memory comprising an error log of the charging station.

In fifth aspect, the invention provides a computer program for the processor in the charging station of the fourth aspect, wherein the computer program product comprises instructions which when executed on the at least one processor in the charging station performs the steps of detecting power on a backup circuit,
running a diagnostic of the charging station,
producing a charger diagnostic, and
transmitting the charger diagnostic to the control system.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
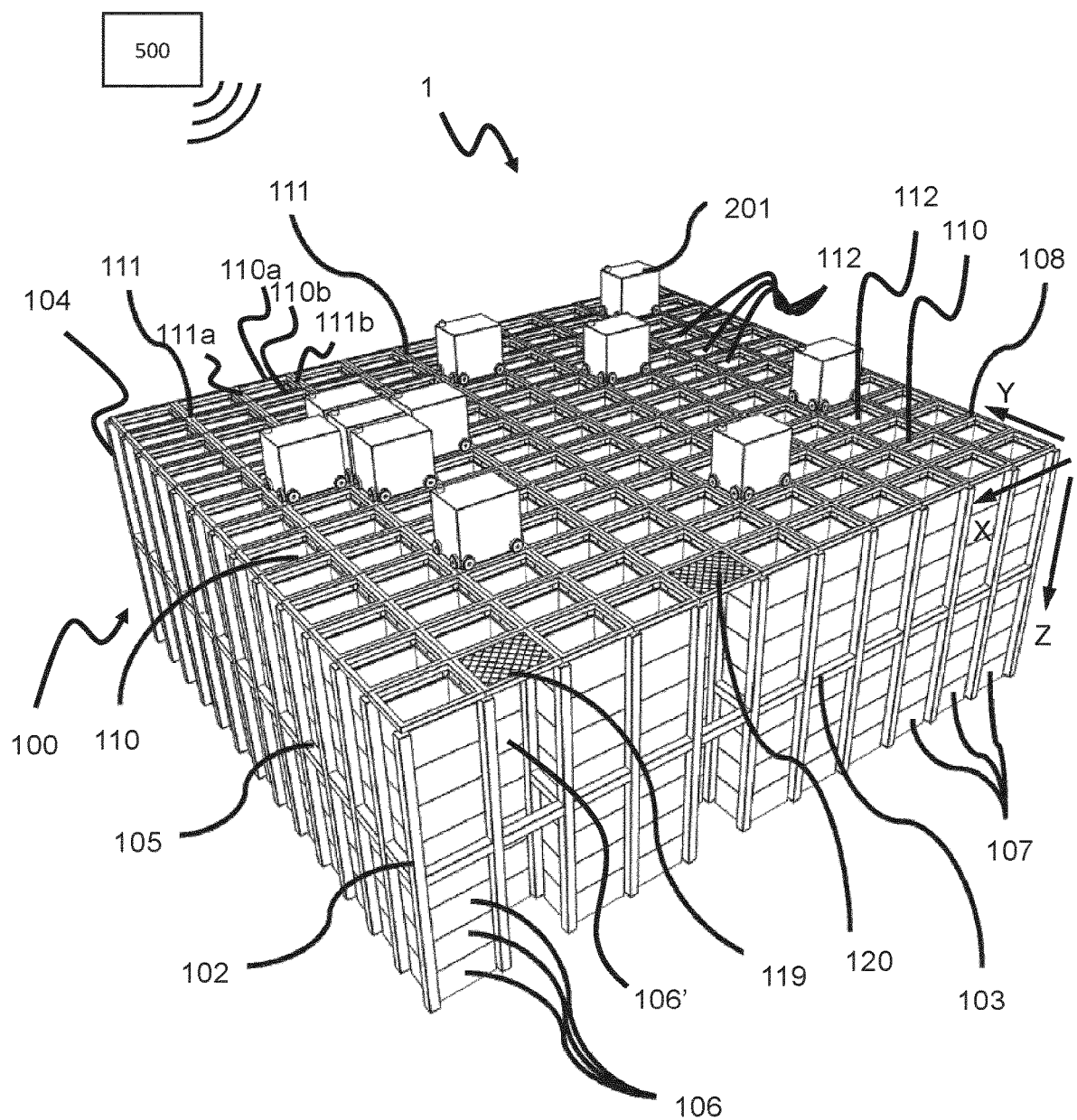
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

One embodiment of the automated storage and retrieval system according to the invention will now be discussed in more detail with reference to FIGS. 4-8.

The exact configuration of the container handling vehicle 3 shown in the figures may vary. The container handling vehicle 3 may for example be the container handling vehicles 201, 301 illustrated in FIG. 2 and FIG. 3. The container delivery vehicle may also be arranged for top-down receival of a storage container 106, and therefore comprises a container carrier arranged above a vehicle body to receive a storage container 106. That type of container delivery vehicle typically operates on a rail system below the rail system 108 of a storage grid 104. The delivery rail system 608 may be constructed in the same way or a similar way as the rail system 108 for the container handling vehicles 201, 301 and have similar types of charger stations.

All vehicles 3, 50 of the automated storage and retrieval system 1 comprise a vehicle body and a wheel assembly (or any other rolling means/rolling device) arranged in a lower section of the vehicle body to enable the lateral movement of the vehicles 3, 50, i.e. the movement of the vehicle 3, 50 in the X and Y. Each of the vehicles 3, 50 operating on the rail system 108, comprises at least one power storage source, and a local controller adapted to control movements of the vehicle 3, 50. The vehicles 3, 50 typically communicates with the control system 500 via wireless communication means, e.g. via a WLAN operating under an IEEE 802.11 (WiFi) standard and/or utilising a mobile telecommunication technology such as 4G or higher. The at least one power storage source may be a removable power source, or fixed within the vehicle 3, 50. Vehicles 3, 50 provided with more than one power storage source may have a combination of removable power storage sources and fixed power storage sources.

The system comprises at least one charging station 40 on or at the perimeter of the rail system 108 adapted to be electrically connected with the at least one power storage source of the at least one vehicle 3, 50. The electrical connection may be provided by any suitable connectors, such as a plug and socket, surface to surface etc. as known by the skilled person. The control system 500 is adapted to communicate with the at least one charging station 40. The charging station comprises a charger communication device adapted to communicate with the control system 500, communicating with the control system via wired or wireless communication means, e.g. via a WLAN operating under an IEEE 802.11 (WiFi) standard and/or utilising a mobile telecommunication technology such as 4G or higher. The charging station 40 is in communication with the central control system for control of the chargers and diagnostics.

The control system 500 may upon detecting a failure with the charging station 40, instruct the at least one vehicle 3, 50 to move to the at least one charging station 40 such that the at least one power storage source of the vehicle 3, 50 electrically connects to the at least one charging station 40. In one embodiment, the charger communication device then receive power from the at least one power storage source and uses that power to transmit charger diagnostics to the control system 500. Detecting a failure with the charging station may comprise detecting a communication failure with the charger communication device of the charging station 40.

If the control system 500 receives a charger diagnostic for the charging station, it may use the information in the charger diagnostic and provide information to an operator of the automated storage and retrieval system 1 about errors to be corrected. If the control system 500 does not receive charger diagnostic, the charger station 40 or the charger communication device may be considered defect. The charger diagnostic comprises at least one of a power supply circuit breaker state, an internal AC circuit breaker state in rectifier, and an error log. The charger diagnostic may be in various formats depending on the implementation, it may be a single code indicative of the fault, a text message, or a string of data. It may not be necessary for the power storage source of the vehicle 3, 50 to supply power to the charging station 40 sufficient for full operation of the charging station 40. The power from the power storage source may only need to supply power to parts of the charging station 40 sufficient to contact the internal processor of the charging station 40 to collect error logs and other relevant data and transmit the diagnostic over the charger communication device. When an error log is present in an internal memory of the charging station, it would only be necessary to supply power to the internal processor, the internal memory, and the charger communication device. In another embodiment, the charging station 40 may perform a self-diagnosis when restarting on power from the power storage source of the vehicle 3, 50.

In one embodiment, the at least one charging device 40 instead of communicating directly with the control system 500, the at least on charging device comprises a charger communication device adapted to communicate indirectly with the control system 500 via the vehicle communication device in the vehicle 3, 50 electrically connected to the charging station 40. The charger communication device is further adapted to receive power from the at least one power storage source to transmit the charger diagnostics to the control system 500 via the vehicle communication device. In this embodiment, the control system 500 does not expect any communication with the charging station before a vehicle is sent to the charging station, e.g. to charge a power storage source. In this case, detecting the failure with the charging station 40 may comprise detecting a communication failure between the charger communication device and the vehicle communication device.

One likely scenario is that the main power supply to the charging station will fail when there is a vehicle 3, 50 electrically connected to the charging station, e.g. the main power supply may fail during charging due to an overloaded power supply circuit. The charging station may then switch to receive power from the power storage source of the vehicle already present at the charging station. However, the power storage source may not have sufficient power to power the charging station 40, e.g. the power storage source may have just arrived depleted at the charging station 40.

The control system 500 keeps track of the location of removable power storage sources in charging stations as well as the location of vehicles 3, 50. Upon determining a failure with the charging station 40, the control system 500, prior to instructing the at least one vehicle 3, 50 to move to the at least one charging station 40, determines that a power storage source is present at the at least one charging station 40. That indicates a possibility for the charging station 40 to receive power from the power storage source of the vehicle already present at the charging station. However, as mention before, the power storage source may not have sufficient power to power the charging station. The control system 500 then waits a predetermined time for the at least one charging station 40 to transmit the charger diagnostics using power from the present power storage source. If diagnostic has been received by the control system 500 within the predetermined time, the control system 500 may determine that the present power storage source is insufficient and instruct the at least one vehicle 3, 50 to move to the at least one charging station 40 to provide another power storage source.

In some instances, there may not be room for a new vehicle and/or power storage source at the charging station 40. In which case, the control system (500) instructs a second vehicle 3, 50 to remove the present power storage source prior to instructing the at least one vehicle 3,50 to move to the at least one charging station 40.

Figure 3:
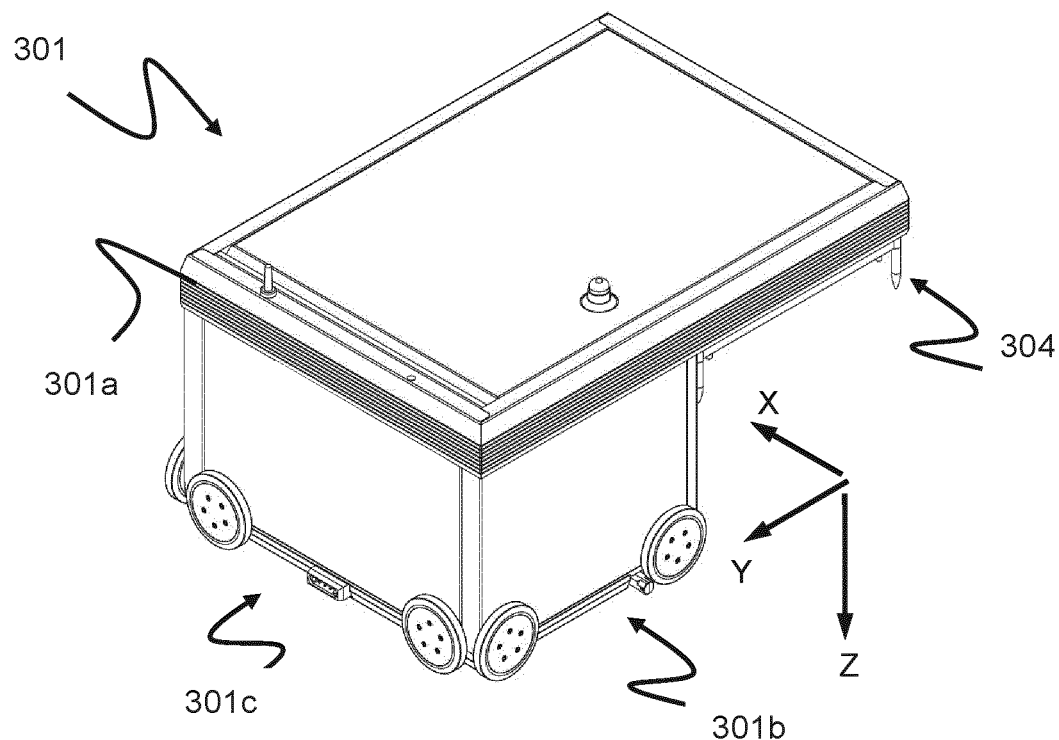
FIG. 3 is a perspective view of a prior art container handling vehicle having a cantilever for carrying storage containers underneath.
Figure 4:
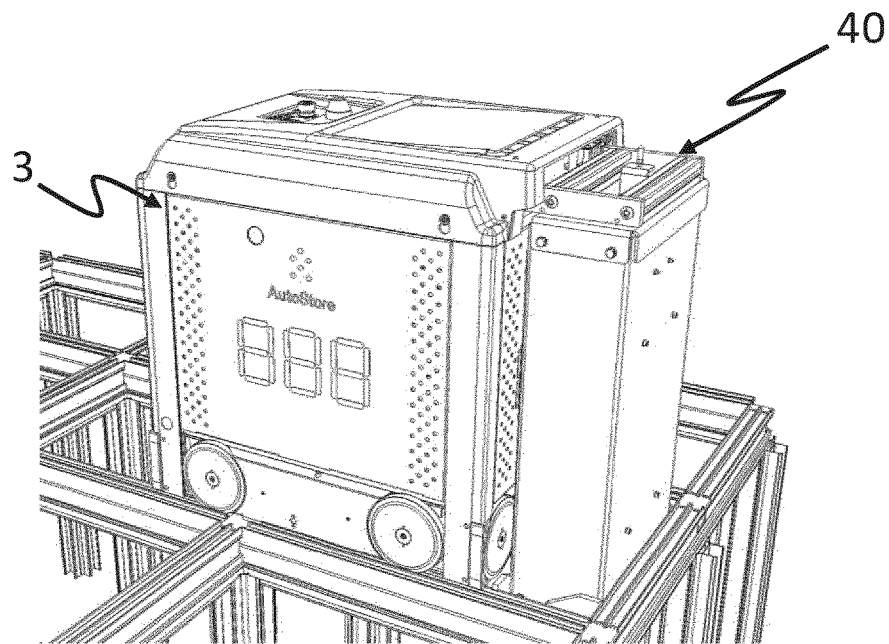
FIG. 4 is a perspective view of a prior art container handling vehicle having a replaceable power storage source connected to a charging station.
Figure 5:
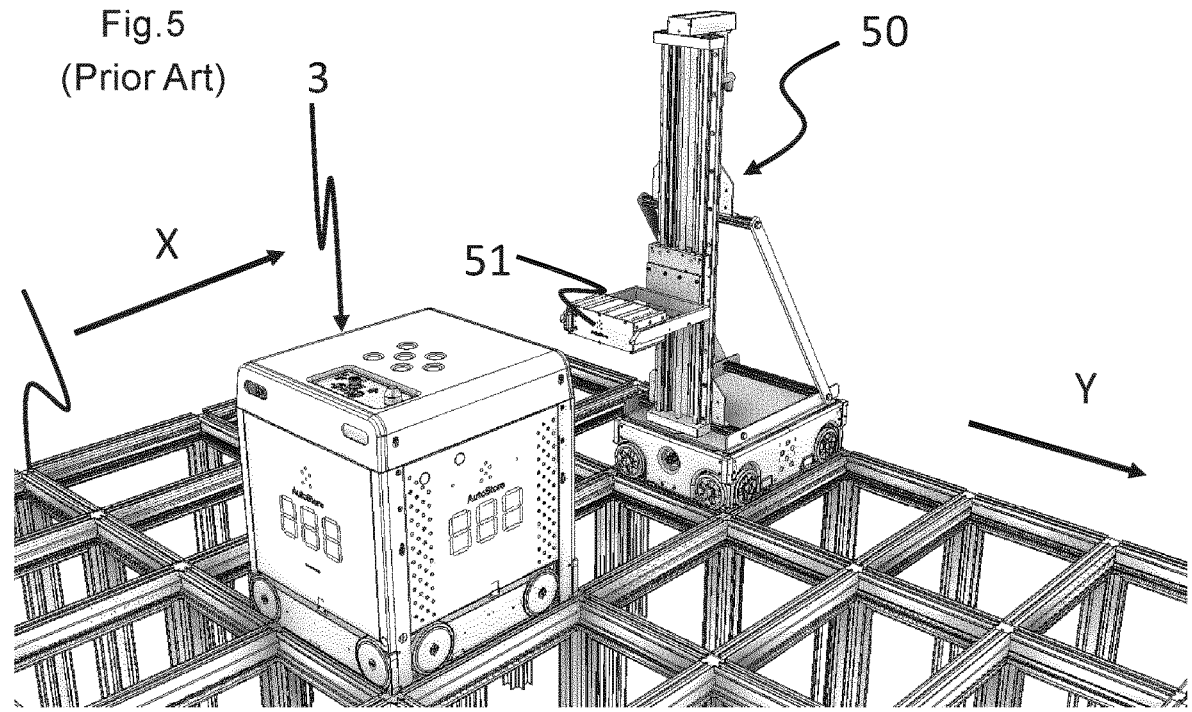
FIG. 5 is a perspective view of a prior art loader vehicle for a power storage source.
Figure 6:
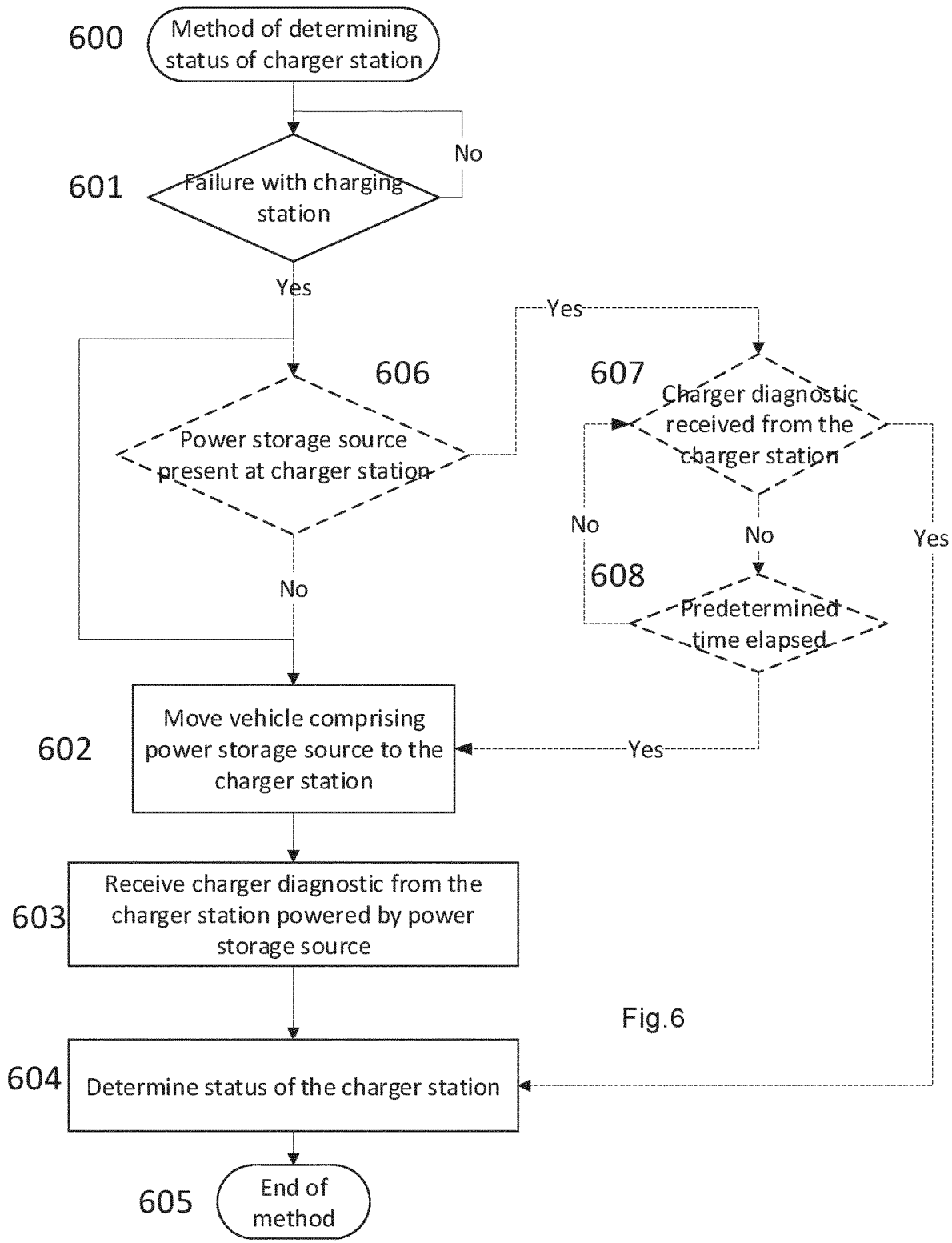
FIG. 6 is a flowchart of an exemplary method of the present invention.

FIG. 3 is a flowchart of a method 600 of determining the status of a charging station 40 in an automated storage and retrieval system 1 as described above. In a first step 601 if a failure with at least one charging station 40 is detected the method proceeds to step 602. If no failure is detected, the step 601 is repeated until a failure is detected.

In step 602 at least one vehicle 3, 50 comprising a power storage source is instructed to move to the at least one charging station 40 such that the at least one power storage source of the vehicle 3, 50 is electrically connected to the at least one charging station 40.

In step 603, a charger diagnostic transmitted from the at least one charging station 40 is received using power from the at least one power storage source of the vehicle 3, 50, and then in step 604 a status of the charger station 40 is determined based on the charger diagnostics from the at least one charger station 40.

In step 606, prior to step 602, it is determined whether a power storage source is present at the at least one charging station 40. If that is not the case, the method proceeds to step 602. If a power storage source is present at the at least one charging station 40, the method proceeds to steps 607 and 608, waiting a predetermined time for the at least one charging station 40 to transmit the charger diagnostic using power from the present power storage source.

If no charger diagnostic is received before the predetermined time has elapsed, the method proceeds to step 602 of instructing the vehicle 3, 50 to move to the at least one charging station 40 such that the at least one power storage source of the vehicle 3, 50 is electrically connected to the at least one charging station 40. If a charger diagnostic is received before the predetermined time has elapsed, the method proceeds to step 604 of determining the status of the charging station 40.

In some embodiments, it may be required to instruct a second vehicle 3, 50 to remove the present power storage source prior to instructing the at least one vehicle 3, 50 to move to the at least one charging station.

Figure 7:
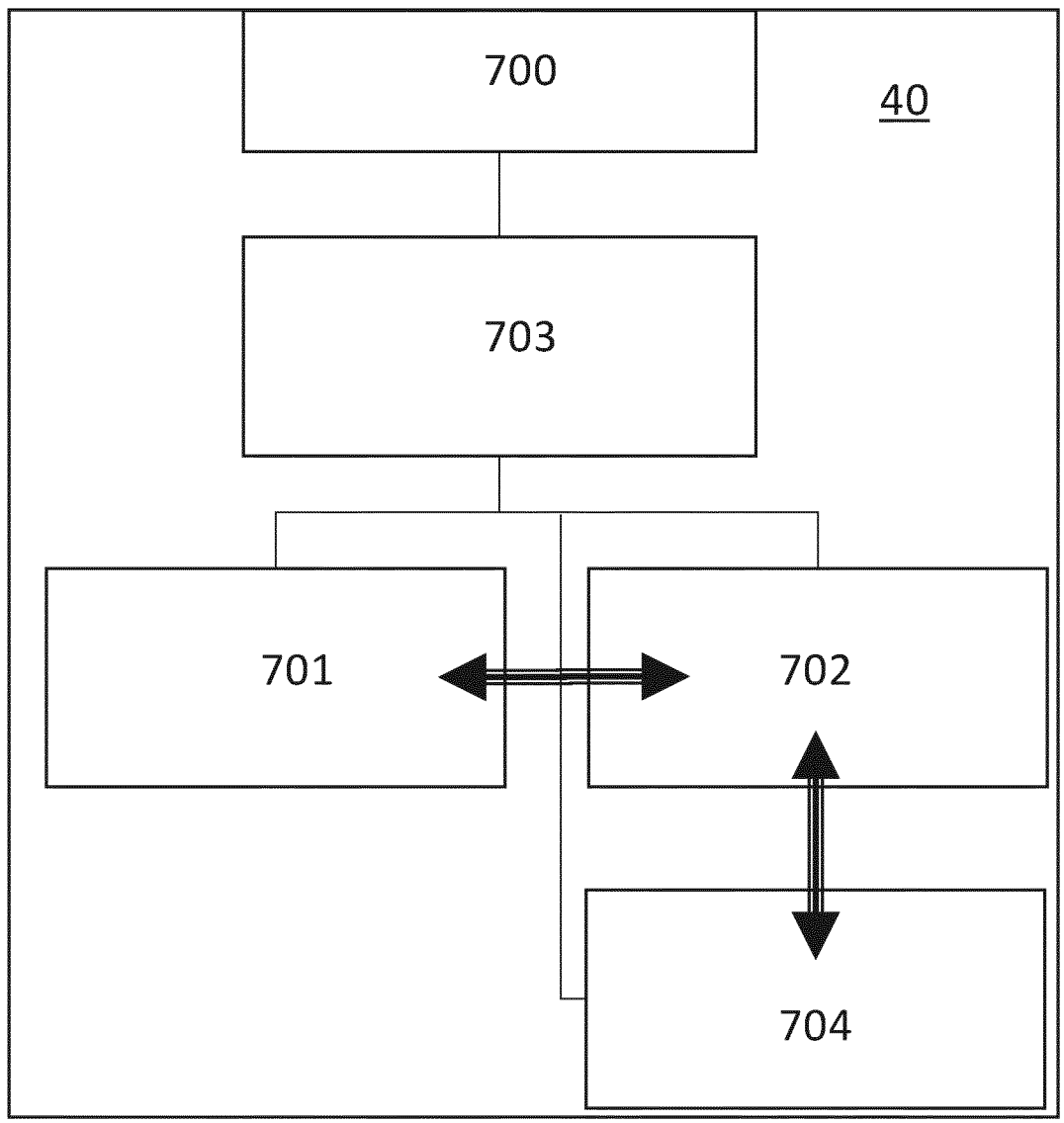
FIG. 7 is a schematic illustration of a charging station.

FIG. 7 is a schematic illustration of a charging station 40. The charging station 40 comprises connectors 700 adapted to electrically connect to the at least one power storage source of the vehicle 3,50. The electrical connection may be provided by any suitable connectors, such as a plug and socket, surface to surface etc. as known by the skilled person. The charging station 40 also comprises at least one charger communication device 701 adapted to communicate with the control system 500. The charger communication device 701 may communicate directly with the control system 500, or may communicated indirectly with the control system 500 via the communicate device of a vehicle 3, 50. It is also shown a processor 702, that may be one of a plurality of processors as needed, the processor 702 is adapted to perform a charger diagnostic of the charging station. The charging diagnostic may be performed by reading an error log from a memory 704 in the charger station 40. The charging station 40 also comprises electronic circuitry 703 adapted to receive power from the at least one power storage source of the vehicle 3, 50, and supply power to the charger communication device 701 and the at least one processor 702 such that the processor 702 performs the charger diagnostic of the charging station 40 and transmits the charger diagnostic to the control system 500 using the at least one charger communication device 701. The electronic circuitry 703 may comprise a normal closed relay switch connected to the mains power supply and electrical connectors of the power storage source of the vehicle, that once the mains power supply fails, switches to receiving power from the at least one power storage source of the vehicle 3, 50.

The system comprises at least one charging station 40 on or at the perimeter of the rail system 108 adapted to be electrically connected with the at least one power storage source of the at least one vehicle 3, 50. The electrical connection may be provided by any suitable connectors, such as a plug and socket, surface to surface etc. as known by the skilled person. The control system 500 is adapted to communicate with the at least one charging station 40. The charging station comprises a charger communication device adapted to communicate with the control system 500, communicating with the control system via wired or wireless communication means, e.g. via a WLAN operating under an IEEE 802.11 (WiFi) standard and/or utilising a mobile telecommunication technology such as 4G or higher. The charging station 40 is in communication In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Figure 2:
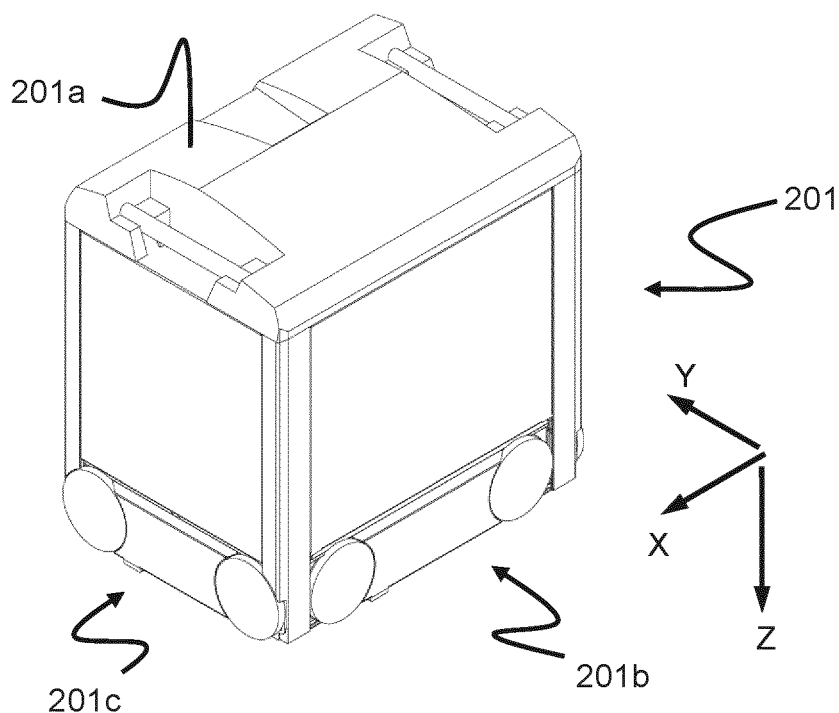
FIG. 2 is a perspective view of a prior art container handling vehicle having a centrally arranged cavity for carrying storage containers therein.

Prior Art (FIGS. 1-3)

1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
X First direction
Y Second direction
Z Third direction

FIGS. 4-7

3 Storage container vehicle
40 Charging station
50 Loader vehicle
51 Replaceable power storage source
600 Method of determining status of charging station
601 Failure with charging station 602 Move vehicle comprising power storage source to the charging station
603 Receive charger diagnostic from the charging station powered by power storage source
604 Determine status of charging station
605 End of method
606 Power storage source present at charging station
607 Charger diagnostic received from the charging station
608 Predetermined time elapsed
700 Connectors
701 Charger communication device
702 At least one processor
703 Electronic circuit
704 Memory

The invention claimed is:

1. An automated storage and retrieval system comprising:
a rail system with a first set of parallel rails extending in a first direction and a second set of parallel rails extending in second direction, wherein the second direction is perpendicular to the first direction;
at least one vehicle operating on the rail system, the at least one vehicle comprising at least one power storage source, and a local controller adapted to control movements of the at least one vehicle;
at least one charging station on or at a perimeter of the rail system adapted to be electrically connected with the at least one power storage source of the at least one vehicle; and
a control system adapted to communicate with the local controller in the at least one vehicle and the at least one charging station;
wherein
the control system, is further adapted to, upon detecting a failure with the at least one charging station, instruct the at least one vehicle to move to the at least one charging station such that the at least one power storage source of the at least one vehicle electrically connects to the at least one charging station; and
the at least one charging station is further adapted to, transmit a charger diagnostic to the control system using power from the at least one power storage source of the at least one vehicle.

2. The system of claim 1, wherein the at least one charging station comprises a charger communication device adapted to communicate with the control system, and the charger communication device is further adapted to receive power from the at least one power storage source to transmit the charger diagnostic to the control system.

3. The system of claim 2, wherein detecting the failure with the at least one charging station comprises detecting a communication failure with the charger communication device of the at least one charging station.

4. The system of claim 1, wherein the at least one charging station comprises a charger communication device adapted to communicate indirectly with the control system via a vehicle communication device in the at least one vehicle electrically connected to the at least one charging station, and the charger communication device is further adapted to receive power from the at least one power storage source to transmit the charger diagnostic to the control system via the vehicle communication device.

5. The system of claim 4, wherein detecting the failure with the at least one charging station comprises detecting a communication failure between the charger communication device and the vehicle communication device.

6. The system of claim 1, wherein the control system is further adapted to, prior to instructing the at least one vehicle to move to the at least one charging station, determine that a power storage source is present at the at least one charging station, and waiting a predetermined time for the at least one charging station to transmit the charger diagnostic using power from the power storage source.

7. The system of claim 6, wherein the control system is adapted to instruct a second vehicle to remove the power storage source prior to instructing the at least one vehicle to move to the at least one charging station.

8. The system of claim 1, wherein the at least one vehicle is a container handling vehicle operating on the rail system to receive storage containers from, and deliver storage containers into, storage columns arranged in rows between upright members and horizontal members of a framework structure, and also to transport the storage containers above or below the storage columns.

9. The system of claim 1, wherein the at least one power storage source is a replaceable power storage source.

10. The system of claim 1, where the at least one vehicle is a loader vehicle for inserting and retrieving replaceable power storage sources from a second vehicle and inserting and retrieving the replaceable power storage sources from the at least one charging station.

11. The system of claim 1, wherein the charger diagnostic comprises at least one of a power supply circuit breaker state, an internal AC circuit breaker state in rectifier, and an error log.

12. A method of determining status of at least one charging station in an automated storage and retrieval system comprising:
a rail system with a first set of parallel rails extending in a first direction and a second set of parallel rails extending in second direction, wherein the second direction is perpendicular to the first direction;
at least one vehicle operating on the rail system, the at least one vehicle comprising at least one power storage source, and a local controller adapted to control movements of the at least one vehicle;
the at least one charging station being on or at a perimeter of the rail system adapted to be electrically connected with the at least one power storage source of the at least one vehicle, wherein the method comprises:
detecting a failure with the at least one charging station,
instructing the at least one vehicle to move to the at least one charging station such that the at least one power storage source of the at least one vehicle is electrically connected to the at least one charging station;
receiving a charger diagnostic transmitted from the at least one charging station using power from the at least one power storage source of the at least one vehicle, and
determining a status of the at least one charging station based on the charger diagnostic received from the at least one charging station.

13. The method of claim 12, wherein the method further comprises, prior to instructing the at least one vehicle to move to the at least one charging station, determine that a power storage source is present at the at least one charging station, and waiting a predetermined time for the at least one charging station to transmit the charger diagnostic using power from the power storage source.

14. The method of claim 13, wherein the method further comprises instructing a second vehicle to remove the power storage source prior to instructing the at least one vehicle to move to the at least one charging station.

15. The method of claim 12, wherein the charger diagnostic comprises at least one of a power supply circuit breaker state, an internal AC circuit breaker state in rectifier, and an error log.

16. A computer program product for a control system in an automated storage and retrieval system comprising:
 a rail system with a first set of parallel rails extending in a first direction and a second set of parallel rails extending in second direction, wherein the second direction is perpendicular to the first direction;
 at least one vehicle operating on the rail system, the at least one vehicle comprising at least one power storage source, and a local controller adapted to control movements of the at least one vehicle;
 at least one charging station being on or at a perimeter of the rail system adapted to be electrically connected with the at least one power storage source of the at least one vehicle, wherein the computer program product comprises instructions which when executed on the control system performs a method of determining status of at least one charging station in the system, wherein the method comprises:
 detecting a failure with the at least one charging station,
 instructing the at least one vehicle to move to the at least one charging station such that the at least one power storage source of the at least one vehicle is electrically connected to the at least one charging station;
 receiving a charger diagnostic transmitted from the at least one charging station using power from the at least one power storage source of the at least one vehicle, and
 determining a status of the at least one charging station based on the charger diagnostic received from the at least one charging station.

17. A charging station for being located on or at a perimeter of a rail system of an automated storage and retrieval system comprising:
 the rail system with a first set of parallel rails extending in a first direction and a second set of parallel rails extending in second direction, wherein the second direction is perpendicular to the first direction;
 at least one vehicle operating on the rail system, the at least one vehicle comprising at least one power storage source, and a local controller adapted to control movements of the at least one vehicle; and
 a control system adapted to communicate with the local controller in the at least one vehicle and the charging station, and is adapted to, upon detecting a failure with the charging station, instruct the at least one vehicle to move to the charging station,
 wherein the charging station comprises:
  connectors adapted to electrically connect to the at least one power storage source of the at least one vehicle;
  at least one charger communication device adapted to communicate with the control system;
  at least one processor adapted to perform a charger diagnostic of the charging station; and
  electronic circuitry adapted to receive power from the at least one power storage source of the at least one vehicle via the connectors, and supply power to the at least one charger communication device and the at least one processor such that the at least one processor performs the charger diagnostic of the charging station and transmits the charger diagnostic to the control system using the at least one charger communication device.

18. The charging station of claim 17, wherein the charging station further comprises memory connected to the electronic circuitry and the at least one processor, the memory comprising an error log of the charging station.

19. A computer program for at least one processor in the charging station of claim 17, wherein the computer program comprises instructions which when executed on the at least one processor in the charging station performs:
 detecting power on a backup circuit,
 running a diagnostic of the charging station,
 producing a charger diagnostic, and
 transmitting the charger diagnostic to the control system.

\* \* \* \* \*